United States Patent
Chiba

(10) Patent No.: US 9,235,787 B2
(45) Date of Patent: Jan. 12, 2016

(54) UPDATING A PRINT JOB TICKET USING A PRINT CONFIGURATION FILE AND A DIFFERENCE FILE

(71) Applicant: CANON KABUSHIKI KAISHA, Tokyo (JP)

(72) Inventor: Kazumi Chiba, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/910,512

(22) Filed: Jun. 5, 2013

(65) Prior Publication Data

US 2013/0335773 A1 Dec. 19, 2013

(30) Foreign Application Priority Data

Jun. 13, 2012 (JP) ................. 2012-133749

(51) Int. Cl.
*G06F 3/12* (2006.01)
*G06K 15/02* (2006.01)

(52) U.S. Cl.
CPC .......... *G06K 15/1805* (2013.01); *G06F 3/1205* (2013.01); *G06F 3/127* (2013.01); *G06F 3/1257* (2013.01); *G06F 3/1286* (2013.01); *G06K 15/1828* (2013.01)

(58) Field of Classification Search
CPC ..... G06F 3/127; G06F 3/1257; G06F 3/1205; G06K 15/1805

USPC ........................................................ 358/1.15
See application file for complete search history.

(56) References Cited

U.S. PATENT DOCUMENTS

| 2006/0176498 A1* | 8/2006 | Wada et al. ................. 358/1.13 |
| 2009/0096866 A1* | 4/2009 | Onomatsu ....................... 348/61 |
| 2011/0134464 A1* | 6/2011 | Chae et al. ................. 358/1.15 |
| 2012/0327437 A1* | 12/2012 | Hanawa ........................ 358/1.9 |

FOREIGN PATENT DOCUMENTS

JP 2006-227992 A 8/2006

* cited by examiner

*Primary Examiner* — Eric A Rust
(74) *Attorney, Agent, or Firm* — Carter, DeLuca, Farrell & Schmidt, LLP

(57) ABSTRACT

The present invention aims to temporarily change print configuration information easily. To achieve such an object, an information processing apparatus of the present invention comprises: a monitoring unit configured to monitor that job data composed of print configuration information data and content data, and a difference file for temporarily changing the print configuration information of the print configuration information data to different print configuration information are put in a hot folder; and a correcting unit configured to, in a case where the job data and the difference file are put in the hot folder, correct the print configuration information data included in the job data on the basis of the difference file.

9 Claims, 15 Drawing Sheets

*FIG. 11A*     901

```xml
<Job>
    :
    <Doc id="d001" startPage="1" endPage="4">
        <Page pageNo="1">
            <ValueParam name="PageCopies">
                <Value>5</Value>
            </ValueParam>
        </Page>
    </Doc>
    :
    <Doc id="d002" startPage="5" endPage="8">
        <Page pageNo="7">
            <ValueParam name="PageCopies">
                <Value>3</Value>
            </ValueParam>
        </Page>
    </Doc>
    :
</Job>
```

*FIG. 11B*     902

```xml
<Job>
    :
    <Doc id="d001" startPage="1" endPage="4">
        <Page pageNo="1">
            <ValueParam name="PageCopies">
                <Value>5</Value>
            </ValueParam>
        </Page>
        <Page pageNo="3">                              ─── 903
            <ValueParam name="PageCopies">
                <Value>2</Value>
            </ValueParam>
        </Page>
    </Doc>
    :
    <Doc id="d002" startPage="5" endPage="8">
        <Page pageNo="7">
            <ValueParam name="PageCopies">
                <Value>3</Value>
            </ValueParam>
        </Page>
    </Doc>
    :
</Job>
```

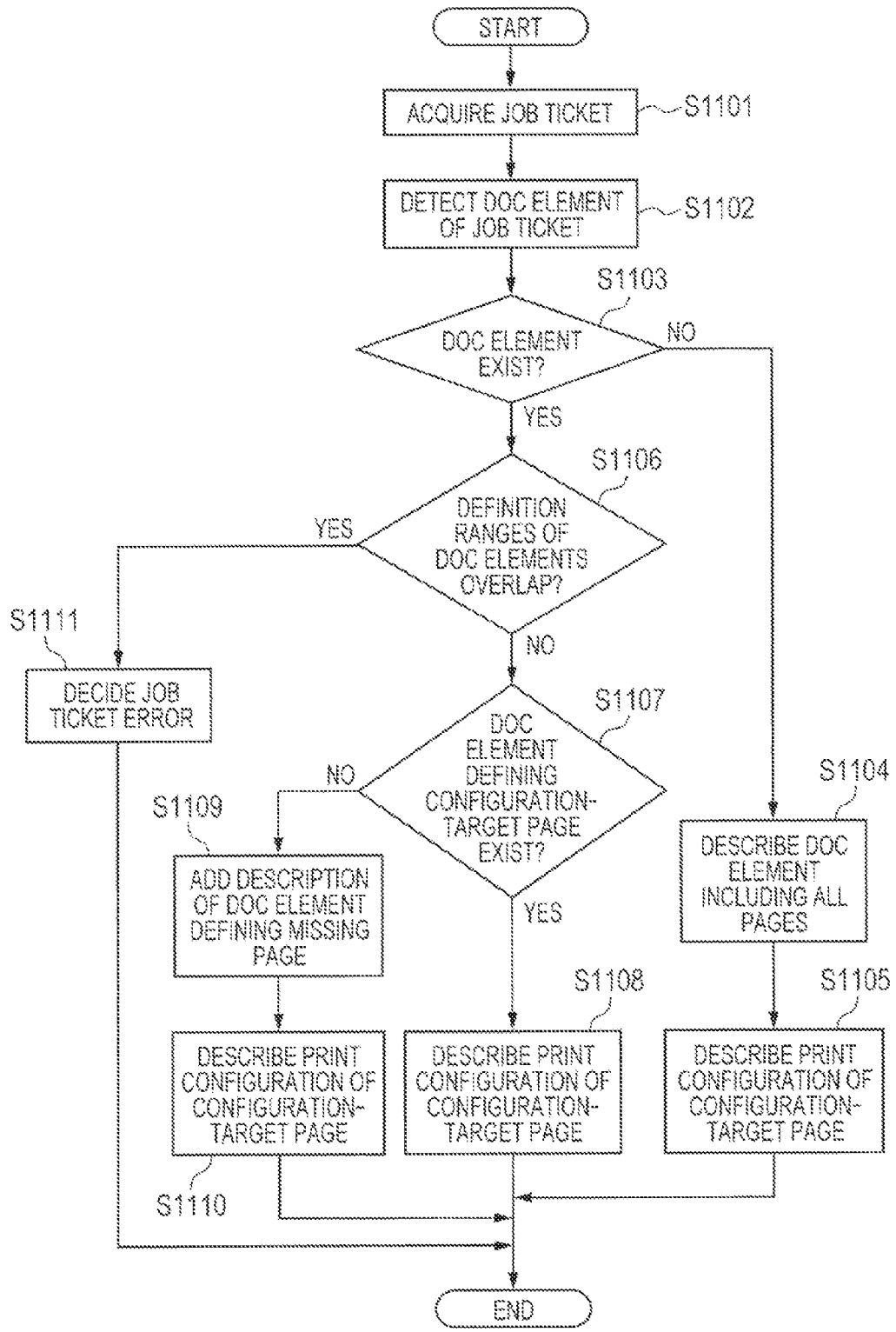

FIG. 13A

```
<Job>
                                                                    1204
    <Doc id="d001" startPage="5" endPage="8">
        <Page pageNo="7">
                <ValueParam name="PageCopies">
                        <Value>3</Value>
                </ValueParam>
        </Page>
    </Doc>
        :
</Job>
```
1201

FIG. 13B

```
<Job>
    <Doc id="d002" startPage="1" endPage="4">              1207
    </Doc>
    <Doc id="d001" startPage="5" endPage="8">
        <Page pageNo="7">
                <ValueParam name="PageCopies">
                        <Value>3</Value>
                </ValueParam>
        </Page>
    </Doc>
        :
</Job>
```
1206

FIG. 13C

```
<Job>
    <Doc id="d002" startPage="1" endPage="4">
        <Page pageNo="3">
                <ValueParam name="PageCopies">      1203
                        <Value>2</Value>
                </ValueParam>
        </Page>
    </Doc>
        :
    <Doc id="d001" startPage="5" endPage="8">
        <Page pageNo="7">
                <ValueParam name="PageCopies">
                        <Value>3</Value>
                </ValueParam>
        </Page>
    </Doc>
        :
</Job>
```
1202

FIG. 14A

```
<Job>
    <Doc id="d001" startPage="1" endPage="2">
        <Page pageNo="1">
            <ValueParam name="PageCopies">
                <Value>3</Value>
            </ValueParam>
        </Page>
    </Doc>
                                                                    ~1604
    <Doc id="d002" startPage="5" endPage="8">
        <Page pageNo="7">
            <ValueParam name="PageCopies">
                <Value>3</Value>
            </ValueParam>
        </Page>
    </Doc>
    :
</Job>
```

FIG. 14B

```
<Job>
    <Doc id="d001" startPage="1" endPage="2">
        <Page pageNo="1">
            <ValueParam name="PageCopies">
                <Value>3</Value>
            </ValueParam>
        </Page>
    </Doc>
    <Doc id="d003" startPage="3" endPage="4">
        <Page pageNo="3">
            <ValueParam name="PageCopies">              ~1603
                <Value>2</Value>
            </ValueParam>
        </Page>
    </Doc>
    <Doc id="d002" startPage="5" endPage="8">
        <Page pageNo="7">
            <ValueParam name="PageCopies">
                <Value>3</Value>
            </ValueParam>
        </Page>
    </Doc>
    :
</Job>
```

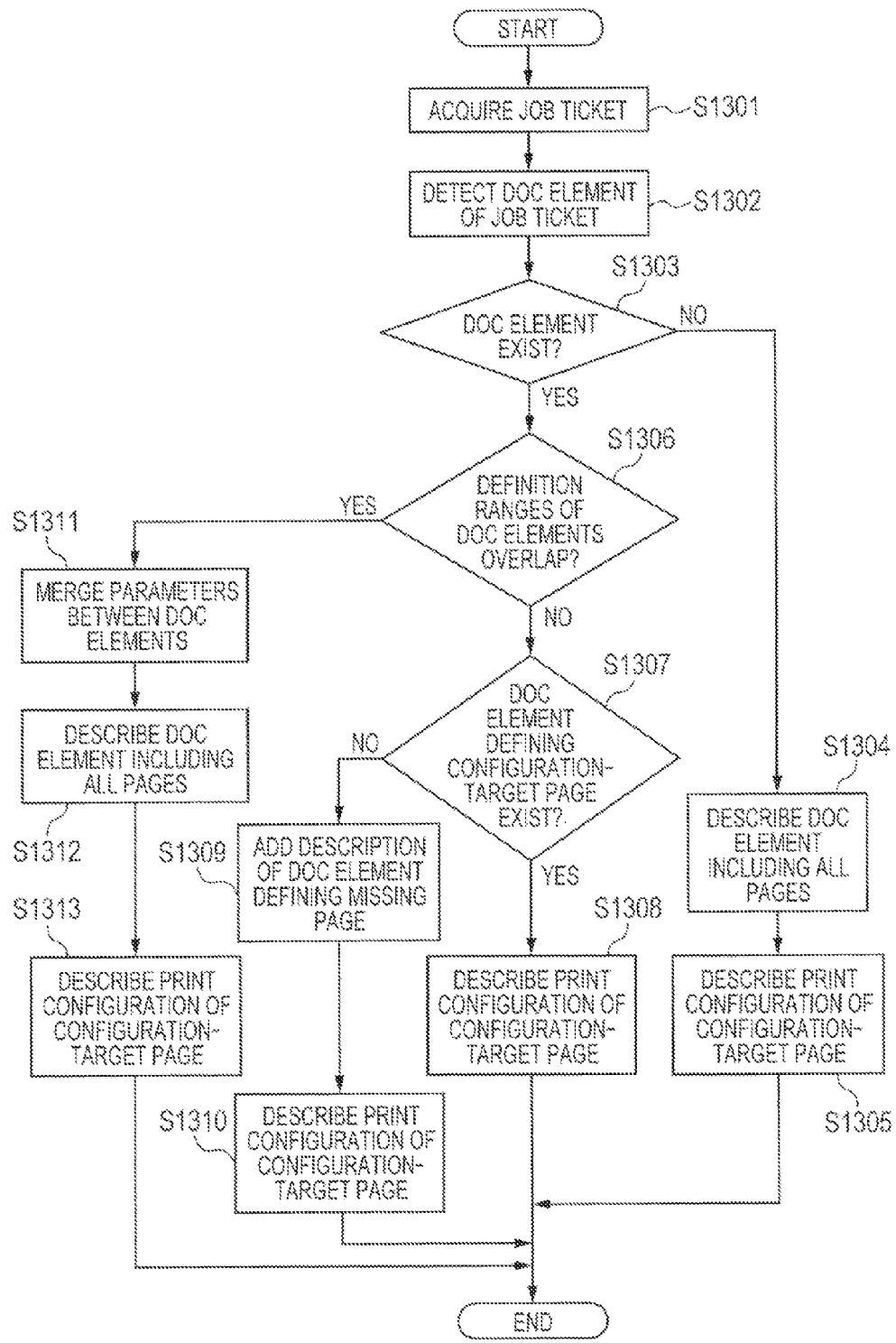

FIG. 16A

```
<Job>
    <Doc id="d001" startPage="1" endPage="7">
        <Page pageNo="6">
                <ValueParam name="PageCopies">
                        <Value>3</Value>
                </ValueParam>
        </Page>
        <Page pageNo="7">
                <ValueParam name="PageCopies">
                        <Value>3</Value>
                </ValueParam>
        </Page>
    </Doc>
    <Doc id="d002" startPage="6" endPage="5">
        <Page pageNo="8">
                <ValueParam name="PageCopies">
                        <Value>1</Value>
                </ValueParam>
        </Page>
    </Doc>
</Job>
```
~1401

FIG. 16B

```
[JOB]

[PAGE]
; CONFIGURATION-TARGET PAGE No.
PageNo=6
; NUMBER OF PRINTS FOR EACH PAGE
PageCopies=2
```
~1403

FIG. 16C

```
<Job>
    <Doc id="d001">
        <Page pageNo="6">
                <ValueParam name="PageCopies">
                        <Value>2</Value>
                </ValueParam>
        </Page>                                              ~1404
        <Page pageNo="7">
                <ValueParam name="PageCopies">
                        <Value>3</Value>
                </ValueParam>
        </Page>
        <Page pageNo="8">
                <ValueParam name="PageCopies">
                        <Value>1</Value>
                </ValueParam>
        </Page>
    </Doc>
</Job>
```
~1402

UPDATING A PRINT JOB TICKET USING A PRINT CONFIGURATION FILE AND A DIFFERENCE FILE

BACKGROUND OF THE INVENTION

1. Field of the Invention

The present invention relates to an information processing apparatus, an information processing method, and a storage medium for storing a program to perform the information processing method.

2. Description of the Related Art

In a photographic processing system or the like, when a user performs printing from another system, the user can use a hot folder application as a print application capable of, without using a specific API (Application Programming Interface), achieving a print function by inserting image data and print configuration information data (or print setting information data) in a folder called a hot folder.

The hot folder is the holder in which data insertion is monitored. When image data and print configuration information data are newly stored in the hot folder, the hot folder application detects the image data and the print configuration information data both newly stored, and performs a print process based on the image data and the print configuration information data both detected. Usually, the hot folder is set within a large-capacity storage such as a hard disk or the like, and the image data and the print configuration information data which are the targets of the print process are stored. Hereinafter, the image data is called content data, the filed print configuration information data is generally called a job ticket or a print ticket, and the job ticket and the content data are collectively called job data.

In general, the same job ticket is often used to the same content data. However, there are cases where a user wishes to temporarily change the print configuration for certain reasons. For example, the user may wish to change a kind of print paper to an inexpensive paper for the purpose of test printing to be performed before real printing, and the user may wish to acquire a plurality of prints. In these cases, when the user intends to directly change the original job ticket, he/she has to know the detailed structure of the relevant job ticket. However, only the users who know the detailed structure of the job ticket do not necessarily change the print configuration, and, there is a possibility that an error occurs when the user changes the print configuration. Further, when the job ticket is a read-only ticket, or when a plurality of users share the job ticket, it is basically impossible to change the job ticket. For such reasons as above, a function which enables to temporarily change the print configuration without changing the original job ticket has been required.

In the related background art, there is the technique of changing the print configuration for each image data on the basis of a first print condition file commonly used throughout a job and a second print condition file set for each image data (Japanese Patent Application Laid-Open No. 2006-227992).

In the relevant technique, although it is possible to set the print configuration for each image data, it is impossible to achieve a temporary change of the print configuration information.

The present invention has been completed in consideration of such problems as above, and an object thereof is to enable the user to easily change the print configuration information temporarily.

SUMMARY OF THE INVENTION

To achieve the above object, the present invention is directed to An information processing apparatus which is characterized by comprising: a monitoring unit configured to monitor that job data composed of print configuration information data and content data, and a difference file for temporarily changing print configuration information of the print configuration information data to different print configuration information are put in a hot folder; and a correcting unit configured to, in a case where the job data and the difference file are put in the hot folder, correct the print configuration information data included in the job data on the basis of the difference file.

Further features of the present invention will become apparent from the following description of exemplary embodiments with reference to the attached drawings.

BRIEF DESCRIPTION OF THE DRAWINGS

FIG. 11A is a diagram illustrating an example of the job ticket which includes Doc elements for defining configuration-target pages.

FIG. 11B is a diagram illustrating an example of the corrected job ticket.

FIG. 12 is a flow chart indicating an example of an information process to be performed by the information processing apparatus according to the second embodiment.

FIG. 13A is a diagram illustrating an example of the job ticket.

FIG. 13B is a diagram illustrating an example of the job ticket acquired in a case where a deficient Doc element is added.

FIG. 13C is a diagram illustrating an example of the job ticket acquired as a result of application of the difference file to the job ticket.

FIG. 14A is a diagram illustrating an example of the job ticket which has Doc elements defining first to second pages and fifth to eighth pages.

FIG. 14B is a diagram illustrating an example of the job ticket acquired as a result of application of the difference file to the job ticket.

FIG. 15 is a flow chart indicating an example of an information process to be performed by the information processing apparatus according to the third embodiment.

FIG. 16A is a diagram illustrating an example of the job ticket which includes a plurality of Doc elements for defining configuration-target pages.

FIG. 16B is a diagram illustrating an example of the difference file.

FIG. 16C is a diagram illustrating an example of the job ticket acquired as a result of application of the difference file to the job ticket.

DESCRIPTION OF THE EMBODIMENTS

Hereinafter, preferred embodiments of the present invention will be described in detail with reference to the attached drawings.

Figure 1A:
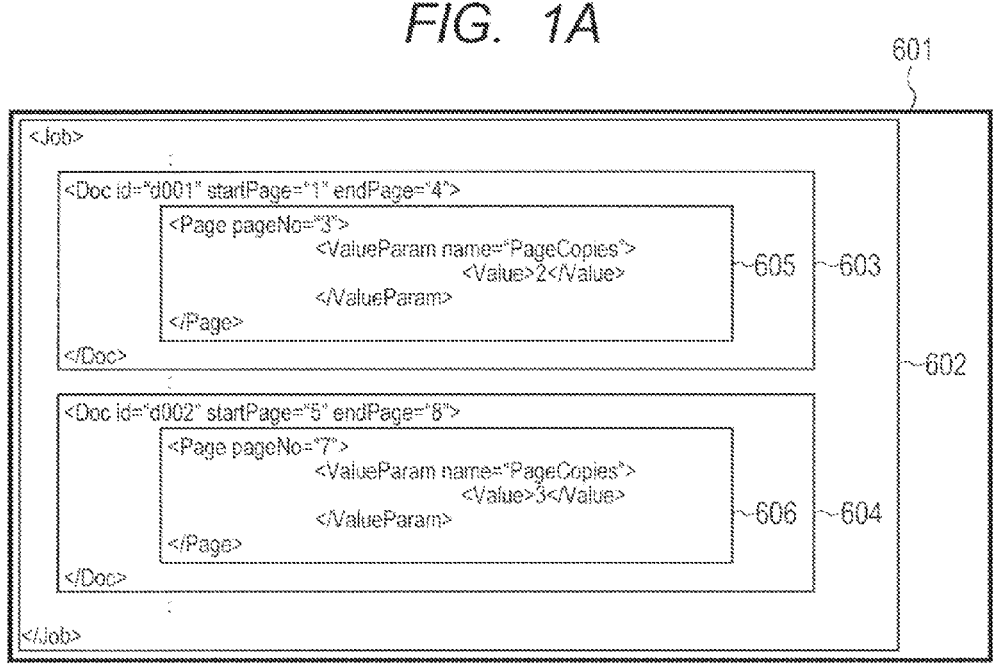
FIG. 1A is a diagram illustrating an example of a job ticket in an XML (Extensible Markup Language) format.

In order to simplify the description, a job ticket to be used in a hot folder application is assumed to be a file of an XML (Extensible Markup Language) format. FIG. 1A is a diagram illustrating an example of a job ticket 601 in the XML format. As illustrated in FIG. 1A, the job ticket has a hierarchical structure. The most significant element is a Job element. A description region 602 is a description region of the Job element. The Job element is such an element which expresses the whole job, and the print configuration, which is related to the whole job, for example, a type of paper to be used for the printing, a size of the printing paper and the like, is described. The job element has a Doc element as a child element. Description regions 603 and 604 are description regions of Doc elements. A group of pages is defined in the Doc element. The Doc element, which means one group within a document, can describe the print configuration of page numbers included between StartPage and Endpage by designating a StartPage number and an Endpage number by using a Page element to be described later. In a case that the StartPage and the Endpage are not designated, this case means that the Doc element is such a Doc element which defines all the pages of contents data. The print configuration can be also described to the Doc element. In this case, the same configuration is applied to all the page numbers defined by the Doc element. The Doc element has a Page element as a child element. Description regions 605 and 606 are description regions of Page elements. The page element means physical pages, and the print configuration of page number to be designated by PageNo of the Page element can be described. When the print configuration is applied to the Job element, Doc element and the Page element, the hierarchies to be applied are respectively called a job level, a document level and a page level.

Although the Job element is an essential element for the job ticket, the Doc element and the Page element can be omitted in a case that the print configuration is not required for the document level and the page level. However, in case of describing the Page element, the Doc element, which is a parent element of the Page element, is always required to be described.

Here, a case that job data is changed by a procedure that print configuration information desired to be temporarily applied to the job ticket is described in a difference file and the hot folder application corrects the job ticket to a parameter and a value described in the difference file is considered. The difference file may be either a text file format or an INI (Initialization) file format. Although it has been described that the job data is constituted by combining the job ticket with contents data, it is allowed that the job data is simply constituted by print configuration information data and the contents data. Incidentally, the difference file may include the print configuration information used for changing a part of the print configuration information of the job ticket.

Figure 1B:
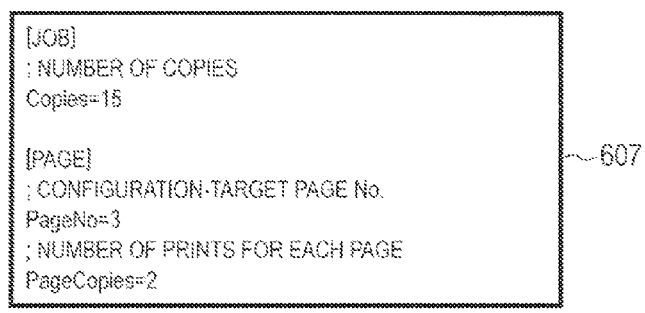
FIG. 1B is a diagram illustrating an example of a difference file.

FIG. 1B is a diagram illustrating an example of a difference file 607. The configuration change related to a job level is described in below of the [Job], and the configuration change related to a page level is described in below of the [Page]. A line of which a head portion has a semicolon ";" is a comment line, which explains a parameter described just below of the line, however, this line can be omitted. As to a parameter described in the difference file, a parameter which is the same as that of the job ticket is used. In the job ticket, configuration of the number of print copies, page designation and the number of print copies to be set every page in the job level are respectively defined by parameters of Copies, PageNo and PageCopies. Therefore, the difference file 607 is such a difference file which defines the print configuration of printing 15 copies of the whole job and printing two copies of third page for the above-mentioned 15 copies.

In case of applying the description contents of the difference file to the job ticket, the print configuration of the job level and page level in the difference file has to be respectively described in the Job element and the Page element of the job ticket. The Job element is an essential element, and since only one element exists for one job, the print configuration addition of the job level can be performed without problem. However, in a case that a description of the Doc element is insufficient as mentioned below, the print configuration of page level cannot be added to the job ticket.

(1) A Doc element does not exist.

(2) Although the Doc element exists, a configuration change-target page is not included.

(3) Although Doc elements exist, plural Doc elements for defining the configuration change-target page exist.

Hereinafter, it will be described about the constitution that the print configuration for each page is temporarily changed even when the description of the Doc element of the job ticket is insufficient.

First Embodiment

It will be described about the first embodiment.

Figure 2:
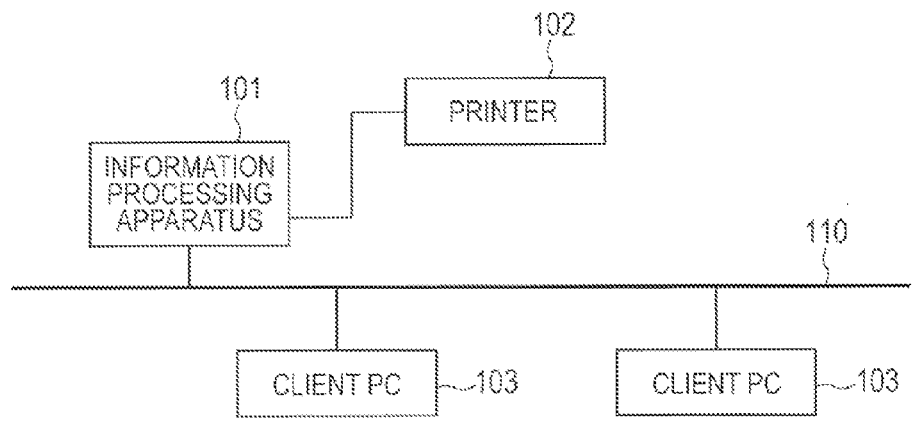
FIG. 2 is a diagram illustrating an example of the system configuration of a print system.

FIG. 2 is a diagram illustrating an example of the system configuration of a print system. An information processing apparatus 101 is located in, for example, a laboratory or the like used for performing a photographic development. The information processing apparatus 101 may be a PC or a private terminal. However, in the present embodiment, it will be described by treating this apparatus as a PC. In the present embodiment, it will be described by assuming that a hot folder is created in the information processing apparatus 101. However, the hot folder may be separately created in a large capacity external storage or the like. A printer 102 is connected with the information processing apparatus 101. The printer 102 is, for example, a laser printer, an inkjet printer, a thermal printer or the like. The printer 102 is used for printing data which was inserted in the hot folder. A client PC 103 inserts job data in the hot folder of the information processing apparatus 101. The client PC 103 can refer to the hot folder of the information processing apparatus 101 shared through a network. A user enables the printer 102 to perform the printing by only storing data into the hot folder from the client PC 103. In FIG. 2, the printer 102 is directly connected with the information processing apparatus 101. However, the printing may be performed by referring to data of the information processing apparatus 101 via a network by connecting the printer 102 to the network. A network 110 is realized by using a wired or wireless LAN (Local Area Network) or the like.

Figure 3:
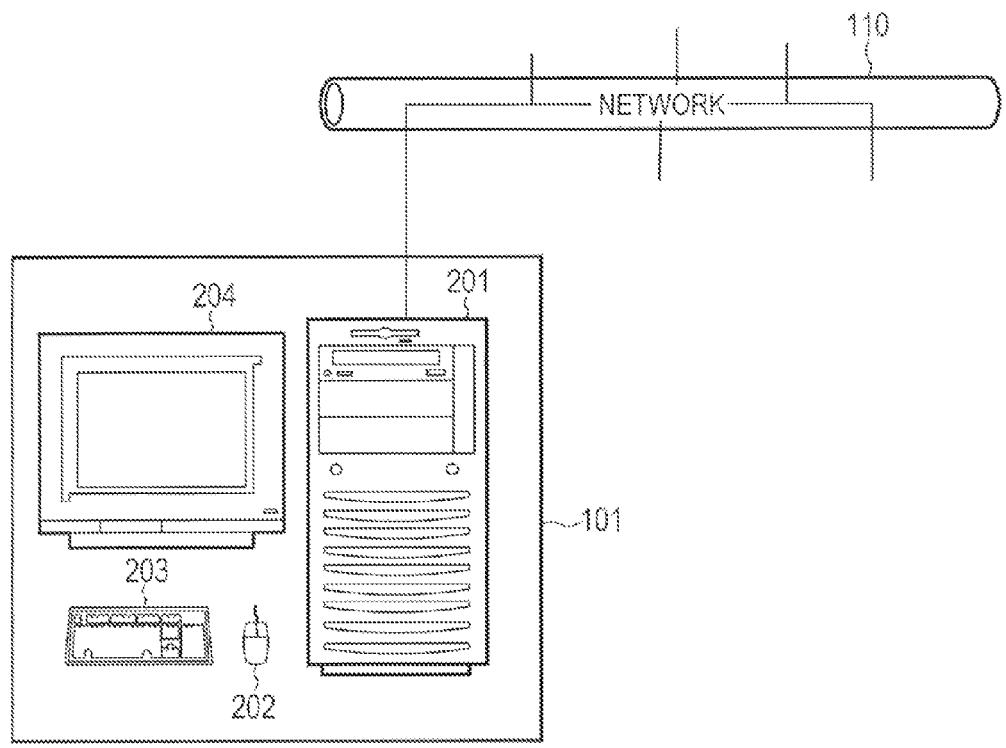
FIG. 3 is a diagram illustrating an example of the external hardware constitution of an information processing apparatus.

FIG. 3 is a diagram illustrating an example of the external hardware constitution of the information processing apparatus 101. A main component of the information processing apparatus 101 is a computer 201. A mouse 202, a keyboard 203 and a display 204 are respectively connected to input/output terminals, which are provided with the computer 201, corresponding to respective components. In the present embodiment, it will be described under the condition that the client PC 103 also has the PC constitution similar to that of the information processing apparatus 101.

Figure 4:
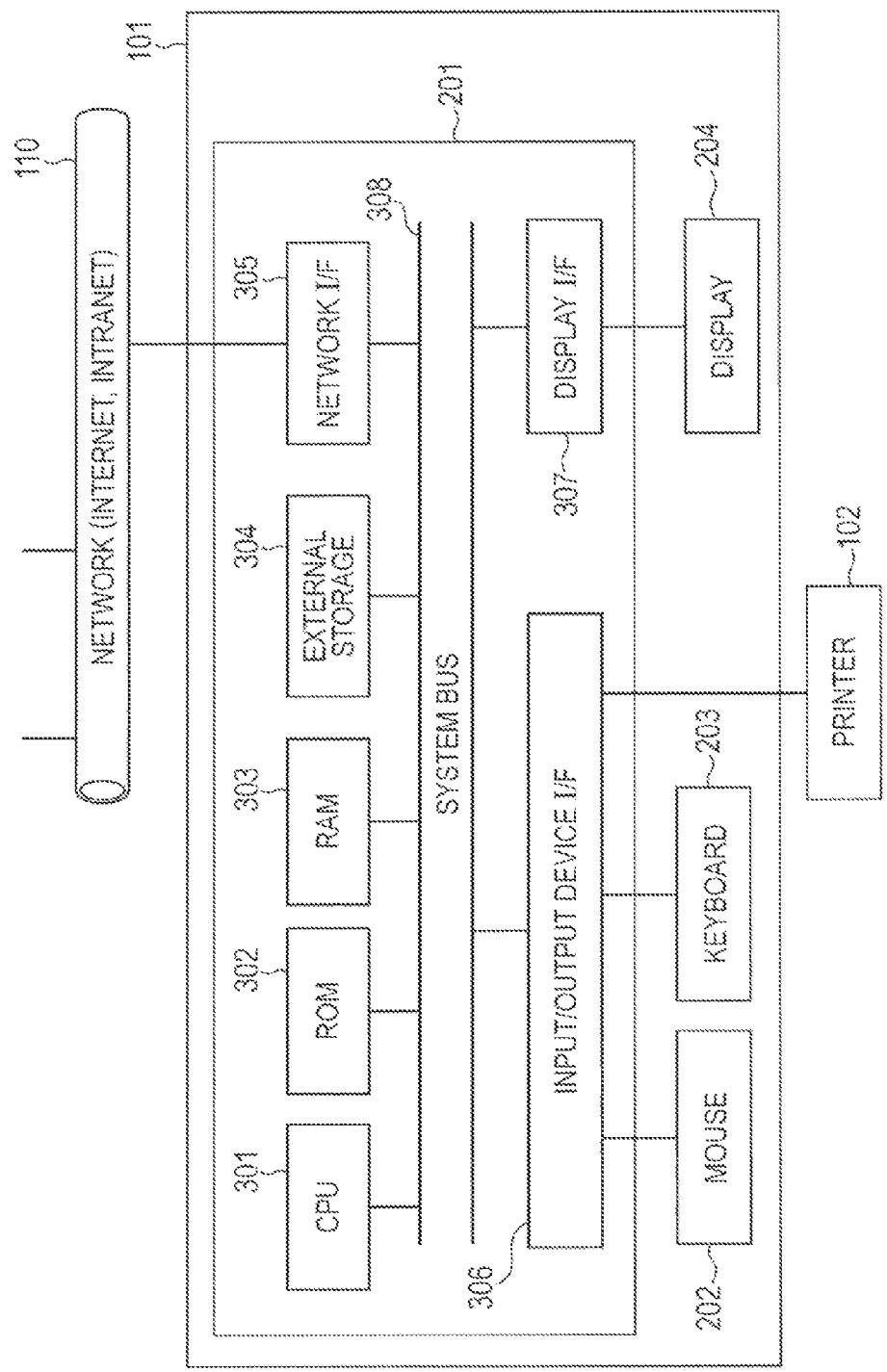
FIG. 4 is a diagram illustrating an example of the internal hardware constitution of the information processing apparatus.

FIG. 4 is a diagram illustrating an example of the internal hardware constitution of the information processing apparatus 101. A print function according to the hot folder is realized by a procedure that a CPU 301 executes a process on the computer 201 on the basis of a hot folder program. The information processing apparatus 101 has the CPU 301, a ROM 302, a RAM 303, an external storage 304, a network I/F 305, an input/output device I/F 306, a display I/F 307, a system bus 308 and the display 204 as the internal hardware. In addition, the information processing apparatus 101 further has the keyboard 203 and the mouse 202 as the internal hardware.

The CPU 301 performs a control process of the whole information processing apparatus 101.

The ROM 302 is a read-only memory. As for the ROM 302, there are a PROM (Programmable ROM), to which a user can perform a process that a program is electrically written in the ROM, and a mask ROM, of which the contents is written in the ROM when the ROM is manufactured, however, either ROM is available in the present embodiment.

The RAM 303 is such a memory, in which data can be freely written, and from which data can be freely read out. The RAM 303 has a function of temporarily storing data when performing a process of the present embodiment.

The external storage 304 is a nonvolatile storage. As the external storage 304, for example, there are an HD drive, a FD drive, an MO drive, a CD-RW drive, a DVD-RW drive, a Blu-ray (a registered trade mark) drive and the like. The hot folder program and data necessary for an operation related to the hot folder program are stored in the external storage 304.

The network I/F 305 processes a communication control used for connecting to a network such as an intranet or the like, however, various communication interfaces are applied in accordance with environment of a user. The network I/F 305 is constituted by an interface of a wireless LAN or an internet of Ethernet (a registered trade mark).

The input/output device I/F 306, which processes data related to input/output operations performed from the keyboard 203, the mouse 202 and the printer 102 included in the information processing apparatus 101, is used for an operation of the information processing apparatus and the input/output operation of data.

The display I/F 307 and the display 204 are display units. This display 204 is realized by using a CRT, a liquid crystal display, a plasma display, a rear projection TV or a front projector and a control circuit thereof.

The system bus 308 is used for performing communication of various data between respective blocks in the information processing apparatus and supplying the power. The system bus 308 consists of an address line, a data line, a control line, a power/ground line and the like.

The software configuration (module configuration) related to a hot folder to be described later or processes related to flow charts can be realized by a procedure that the CPU 301 executes processes on the basis of the hot folder program.

Figure 5:
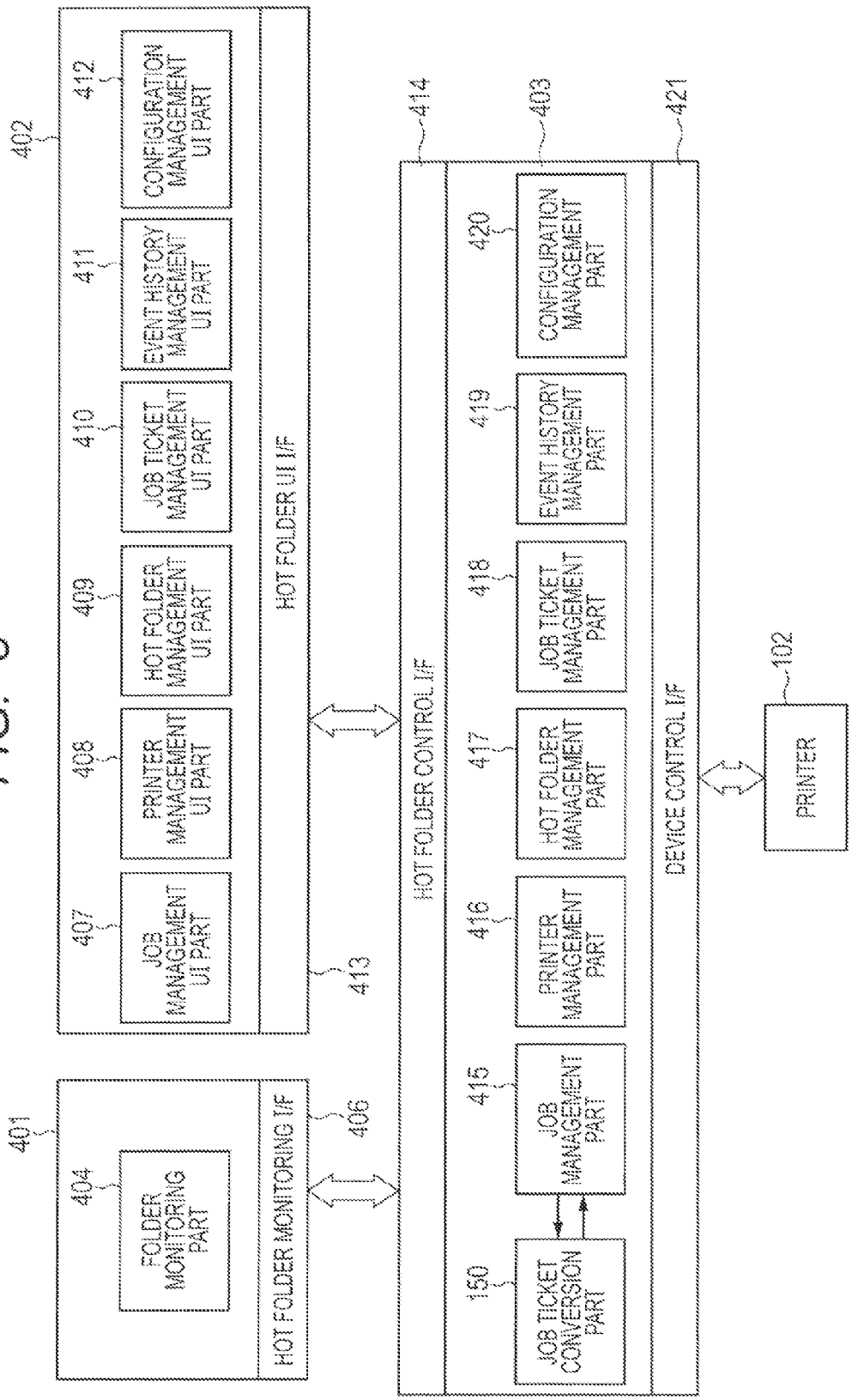
FIG. 5 is a diagram illustrating an example of a software configuration concerning a hot folder of the information processing apparatus.

FIG. 5 is a diagram illustrating an example of a software configuration of a hot folder application of the information processing apparatus 101. The software concerning the hot folder has a hot folder monitoring part 401, a hot folder UI part 402 and a hot folder control part 403. The hot folder monitoring part 401 monitors a folder of the hot folder and detects job data. The hot folder UI part 402 controls information to be displayed on a display in the hot folder. The hot folder control part 403 manages a control of the hot folder. The hot folder monitoring part 401 has a folder monitoring part 404 and a hot folder monitoring I/F 406. The folder monitoring part 404 monitors the hot folder. The hot folder monitoring I/F 406 performs a print request to the hot folder control part 403 through this I/F when a new print request was generated.

The hot folder UI part 402 has a job management UI part 407, a printer management UI part 408, a hot folder management UI part 409, a job ticket management UI part 410, an event history management UI part 411 and a configuration management UI part 412. In addition, the hot folder UI part 402 has a hot folder UI I/F 413. The job management UI part 407 is a UI display part used for managing a print job. The printer management UI part 408 displays information concerning a printer which is managed in the hot folder. The hot folder management UI part 409 displays hot folder information which is currently managed. The job ticket management UI part 410 displays configuration information which is called a job ticket to be transferred to a printer. The event history management UI part 411 displays histories of various events information such as the print end, the no paper and the like to be informed from the printer. The configuration management UI part 412 is a display part of the configuration information of the hot folder program. The hot folder UI I/F 413 is an I/F part which communicates with the hot folder control part 403.

The hot folder control part 403 has a hot folder control I/F 414, a job management part 415, a printer management part 416, a hot folder management part 417, a job ticket management part 418, an event history management part 419 and a configuration management part 420. In addition, the hot folder control part 403 has a device control I/F 421. The hot folder control I/F 414 is connected with the hot folder monitoring I/F 406 and the hot folder UI I/F 413. The job management part 415 performs a management of a print job. The printer management part 416 performs a management of a printer which is managed by the hot folder. The hot folder management part 417 performs a management of hot folder information. The job ticket management part 418 performs a management of a job ticket. The event history management part 419 manages histories of various events information such as the print end, the no paper and the like to be informed from the printer. The configuration management part 420 performs a management of configuration information of the hot folder program. A job ticket conversion part 150 operates as a sub module of the job management part 415. The job ticket conversion part 150 acquires job data and a difference file from the job management part 415 and converts the job ticket. The details of a process executed in the job ticket conversion part 150 will be described later. The device control I/F 421 is an interface part which communicates with the printer device (printer 102).

Figure 6:
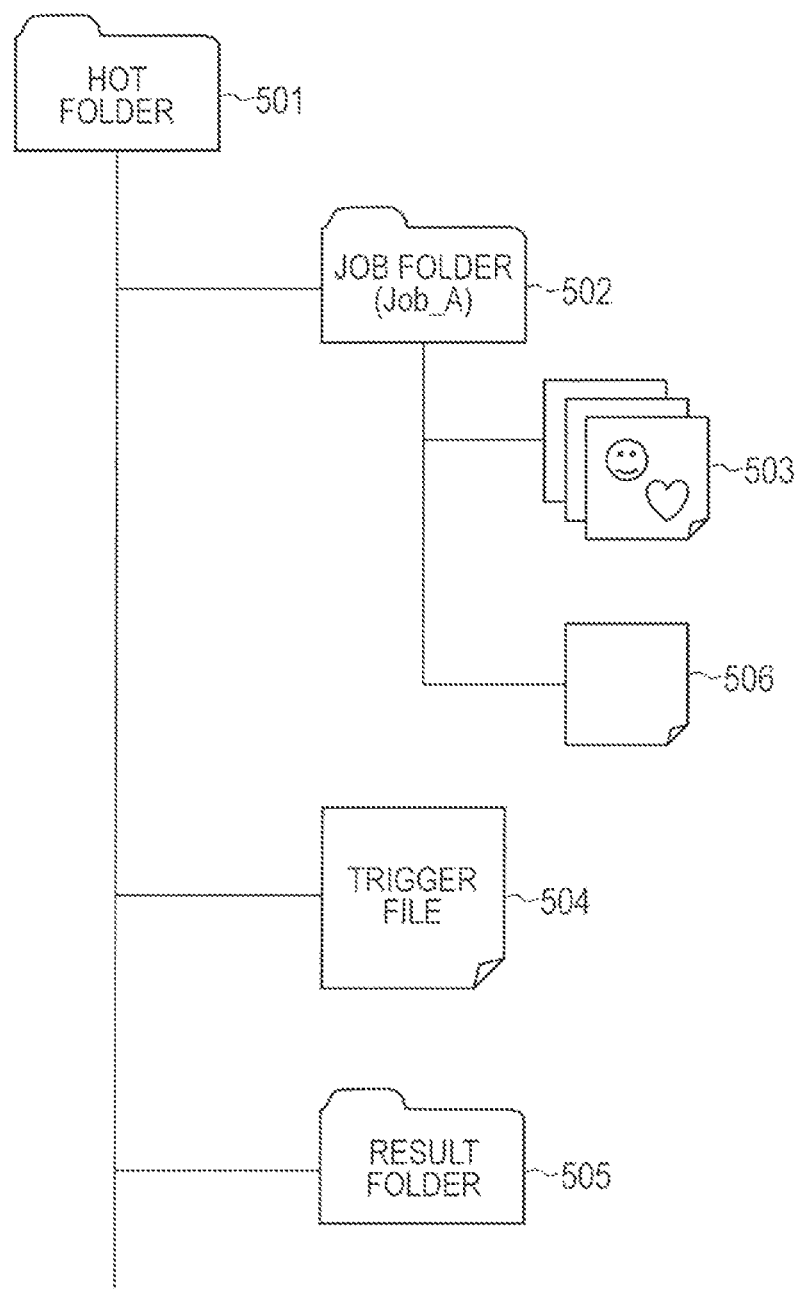
FIG. 6 is a diagram illustrating an example of the folder configuration of the hot folder.

FIG. 6 is a diagram illustrating an example of the folder configuration of the hot folder. A root folder 501 is a root folder of the hot folder. A job folder 502 is a job folder created every job in the hot folder. Job data 503 is such job data, which was stored in the job folder 502, consists of contents data and a job ticket. A difference file 506 is such a difference file which was stored in the job folder 502. A trigger file 504 is a trigger file. A print job of a folder, which has the same name as that of the trigger file, is started at the timing when this trigger file 504 was put. A result folder 505 is a result folder (Result Folder) in which the completed job is stored. Incidentally, the trigger file is created by a procedure that, for example, a user creates a new text file and the same name as that of the job data is set to a name of that text file and then an extension is set as ".trg". Then, when the user stores the trigger file in the hot folder, the hot folder application starts the print processing of job data, which is in a folder of which a name is the same as that of the trigger file. For example, the hot folder application transmits the job data to the software used for the printing (for example, a printer driver), and the software used for the printing converts the job data into print data, which can be interpreted by a printer. Incidentally, the hot folder application may directly transmit the job data to the printer.

In addition, the difference file and the job ticket are also created by a user. For example, a cjt.ini file is created from a text file which was newly created by the user. Then, the job ticket and the difference file are created by describing desired print configuration information in this ini file. Incidentally, the difference file is stored in the job folder with the same timing as that of the job data or before the trigger file is put.

Module Configuration of Job Ticket Conversion Part

Figure 7:
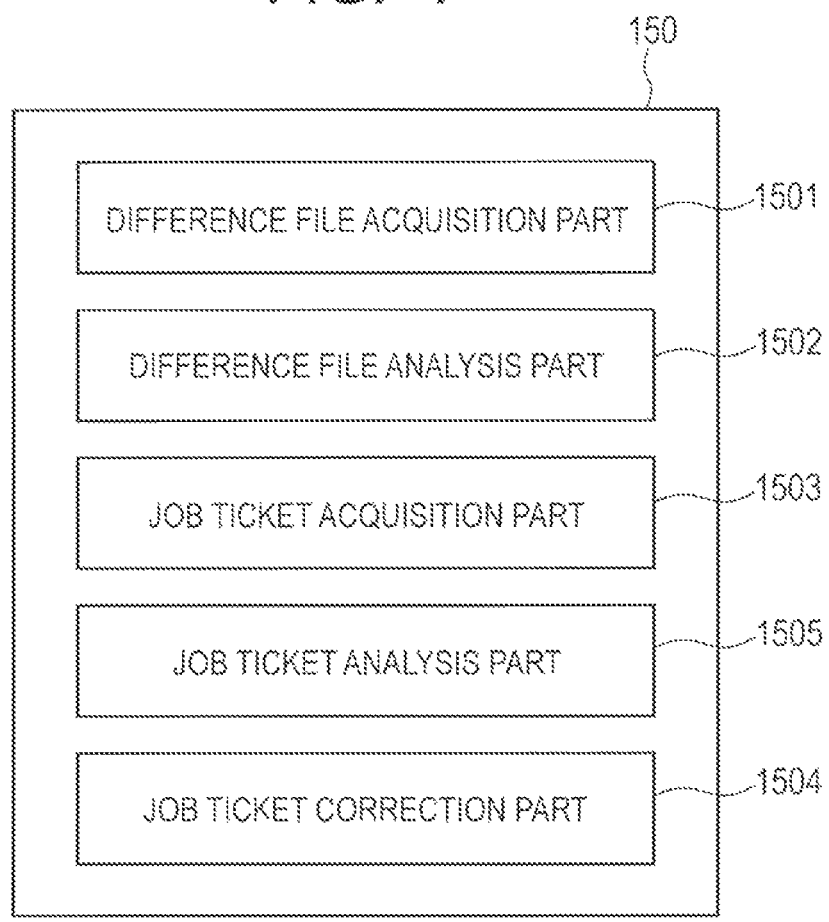
FIG. 7 is a diagram illustrating an example of the module configuration of a job ticket conversion part operating as a sub module of a job management part.

FIG. 7 is a diagram illustrating an example of the module configuration of the job ticket conversion part 150 operating as a sub module of the job management part 415. The job ticket conversion part 150 has a difference file acquisition part 1501, a difference file analysis part 1502, a job ticket acquisition part 1503, a job ticket analysis part 1505 and a job ticket correction part 1504. The job ticket conversion part 150 of the present embodiment operates by being called from the job management part 415 when the print job is started after that the job data 503 was stored in the above-mentioned job folder 502 and the trigger file was put. The job ticket conversion part 150 of the present embodiment operates on the client PC 103 illustrated in FIG. 2 and a control of an execution process is performed to each module in the CPU 301 illustrated in FIG. 4. The difference file acquisition part 1501 acquires a difference file from the job management part 415. The difference file analysis part 1502 analyzes the description contents of the difference file acquired by the above-mentioned difference file acquisition part 1501. The job ticket acquisition part 1503 acquires a job ticket from the job management part 415. The job ticket analysis part 1505 analyzes information of the Doc element from the description contents of the job ticket. The information of the Doc element means the number of Doc elements included in the job ticket, a page number defined by each Doc element and the print configuration information of page level which is in a low-level hierarchy of the each Doc element. The job ticket correction part 1504 corrects the job ticket on the basis of the above-mentioned analyzed result of the difference file.

Figure 8:
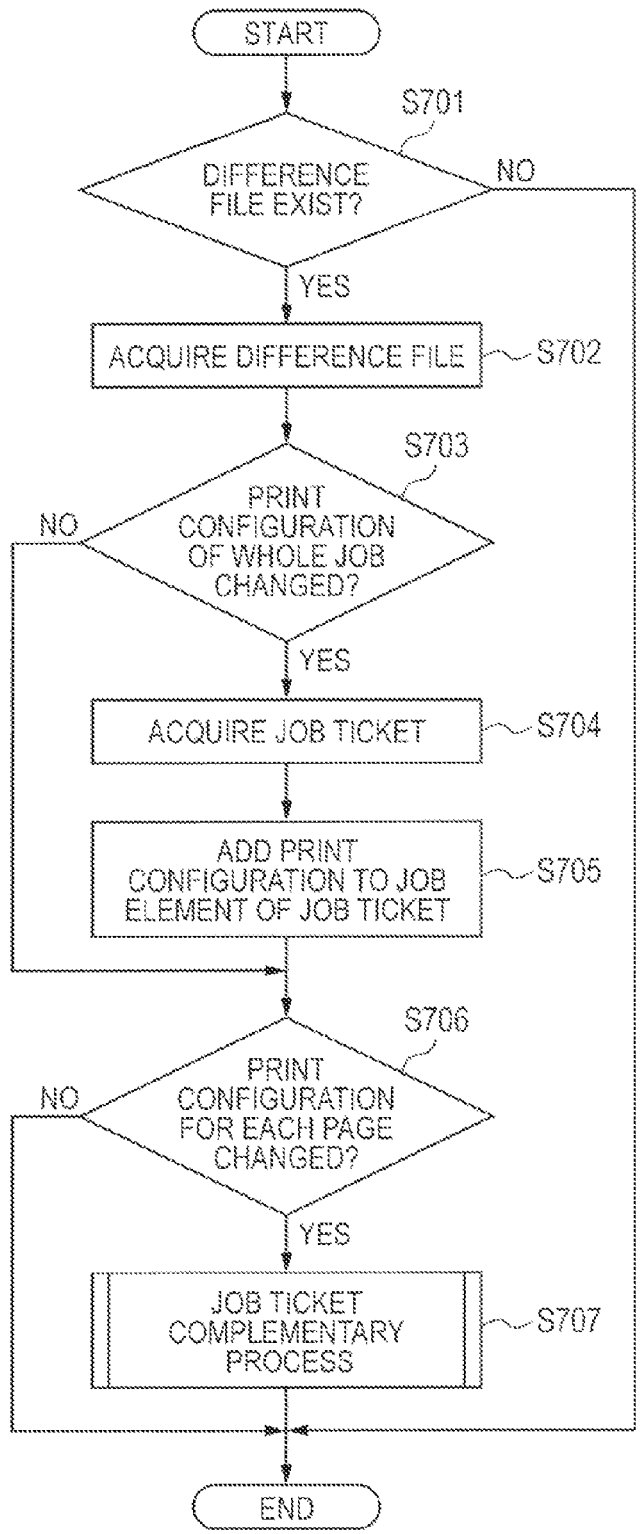
FIG. 8 is a flow chart indicating an example of an information process to be performed by the information processing apparatus according to the first embodiment.

FIG. 8 is a flow chart indicating an example of an information process to be performed in the information processing apparatus according to the first embodiment.

In a step S701, the difference file acquisition part 1501 judges whether or not the difference file exists in data to be acquired from the job management part 415. As a result of judgment in the step S701, when the difference file does not exist, since the difference file acquisition part 1501 is not required to change the job ticket, a process indicated in FIG. 8 is terminated. As a result of judgment in the step S701, when the difference file exists, the difference file acquisition part 1501 advances the process to a step S702.

In the step S702, the difference file acquisition part 1501 acquires the difference file. Then, the difference file analysis part 1502 analyzes the description contents of the difference file which was acquired by the difference file acquisition part 1501.

Next, in a step S703, the difference file analysis part 1502 judges whether or not the configuration change for the whole job exists from the analyzed result of the difference file. When the configuration change for the whole job does not exist, the difference file analysis part 1502 advances a process to a step S706. When the configuration change for the whole job exists, the difference file analysis part 1502 advances the process to a step S704.

In the step S704, the job ticket acquisition part 1503 acquires a job ticket from the job management part 415.

Next, in a step S705, the job ticket correction part 1504 describes the print configuration for the whole job acquired from the difference file in a job level of the job ticket.

Next, in a step S706, the difference file analysis part 1502 judges whether or not the print configuration of page level exists in the difference file. When the print configuration of page level does not exist, the difference file analysis part 1502 terminates the process indicated in FIG. 8. When the print configuration of page level exists, the difference file analysis part 1502 advances the process to a step S707.

In the step S707, the difference file analysis part 1502 performs a job ticket complementary process. Hereinafter, a page described in the difference file is called a "configuration-target page". The details of the job ticket complementary process will be described later in FIG. 9.

Figure 9:
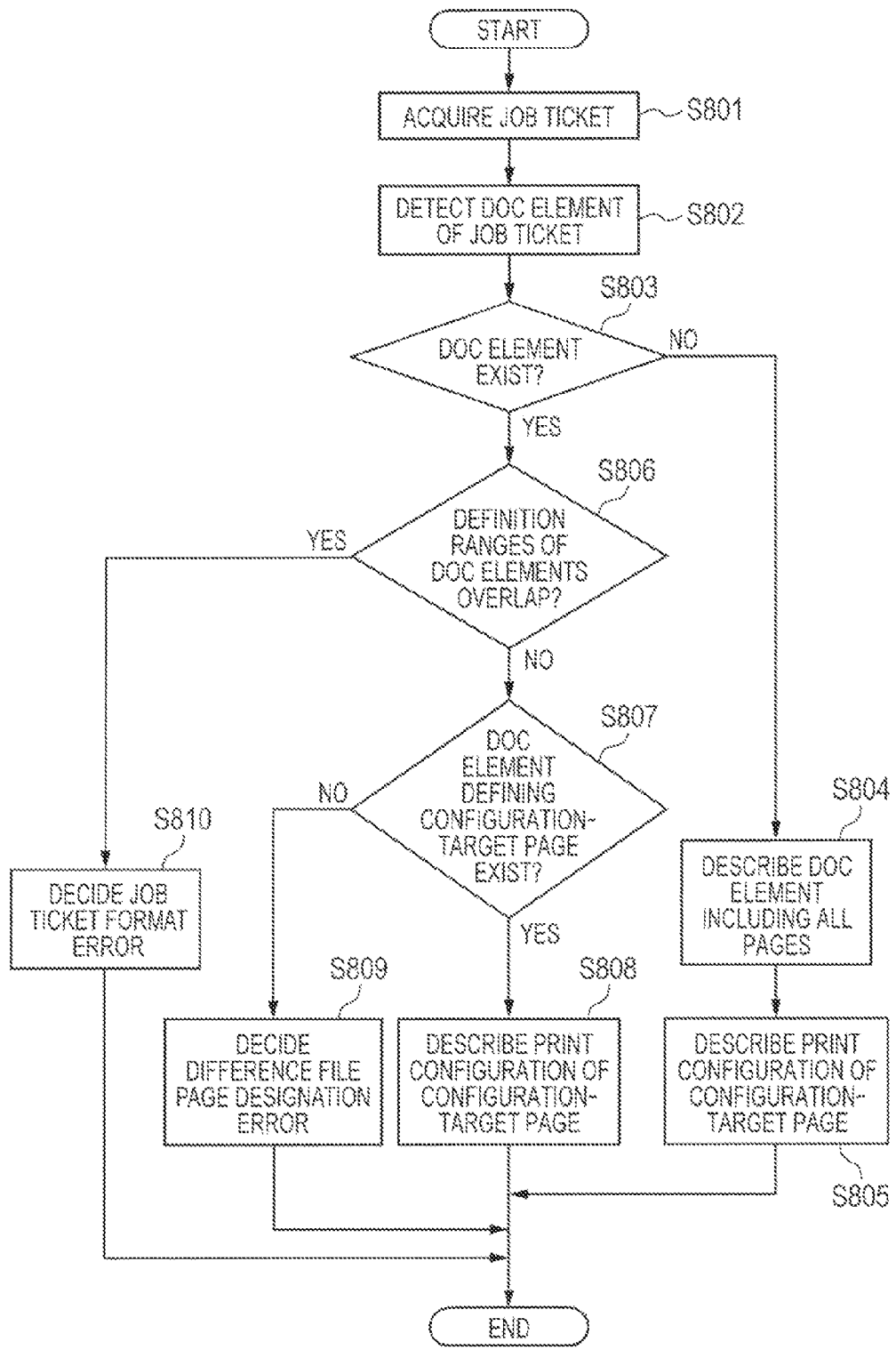
FIG. 9 is a flow chart indicating an example of a job ticket complementary process.

FIG. 9 is a flow chart indicating an example of the job ticket complementary process.

First, in a step S801, the job ticket acquisition part 1503 acquires a job ticket from the job management part 415.

Next, in a step S802, the job ticket analysis part 1505 detects Doc elements of the job ticket and acquires the number of Doc elements, a page number defined by each Doc element and information of a Page element defined in the each Doc element.

Next, in a step S803, the job ticket analysis part 1505 judges whether or not the Doc element exists in the job ticket from the above-mentioned analyzed result of the job ticket. When the Doc element exists, the job ticket analysis part 1505 advances a process to a step S806, and when the Doc element does not exist, the job ticket analysis part 1505 advances the process to a step S804.

In the step S804, the job ticket correction part 1504 describes the Doc element which defines all the pages in a low-level hierarchy of a Job element of the job ticket.

Next, in a step S805, the job ticket correction part 1504 describes the print configuration of a configuration-target page in a low-level hierarchy of the Doc element. The content of the difference file is described in the print configuration of this configuration-target page.

In order to describe the Doc element which defines all the pages, the job ticket correction part 1504 may just describe the Doc element which does not include a page designation.

On the other hand, in the step S806, the job ticket analysis part 1505 judges whether or not the Doc elements, of which page ranges to be defined are overlapped, exist from the above-mentioned analyzed result of the job ticket. For example, a case, where Doc elements from second page to fifth page and Doc elements from third page to eighth page are included, corresponds to an overlapped case. When the Doc elements, of which the page ranges to be defined are overlapped, exist, the job ticket analysis part 1505 advances a process to a step S810, and when the Doc elements, of which the page ranges to be defined are overlapped, do not exist, the job ticket analysis part 1505 advances the process to a step S807.

In the step S810, the job ticket analysis part 1505 terminates a process indicated in FIG. 9 by treating as a job ticket format error.

On the other hand, in the step S807, the job ticket analysis part 1505 judges whether or not a Doc element which defines a configuration-target page exists from the above-mentioned analyzed result of the job ticket. When the Doc element which defines the configuration-target page exists, the job ticket analysis part 1505 advances a process to a step S808, and when the Doc element which defines the configuration-target page does not exist, the job ticket analysis part 1505 advances the process to a step S809.

In the step S808, the job ticket correction part 1504 describes the print configuration of the configuration-target page in a low-level hierarchy of the Doc element. The contents of the difference file are described in the print configuration of this configuration-target page. In a case that parameters of the configuration-target page already exist in the job ticket, the job ticket correction part 1504 replaces only the value of the print configuration with a value of the difference file. On the other hand, in the step S809, the job ticket analysis part 1505 terminates the process indicated in FIG. 9 by treating as a difference file page designation error. In the steps S809 and S810, when error states are judged, a fact of these errors is informed to a user by the hot folder application software. An informing method may be any method if a user can recognize a fact of the errors.

Figure 10A:
FIG. 10A is a diagram illustrating an example of the job ticket.
Figure 10B:
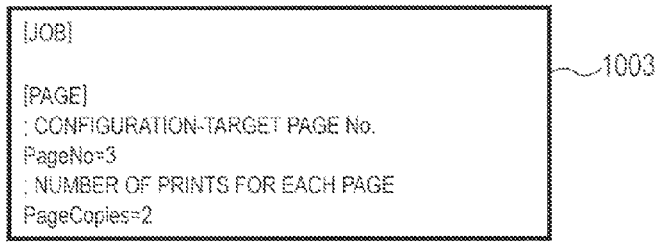
FIG. 10B is a diagram illustrating an example of the difference file.

FIG. 10A is a diagram illustrating an example of a job ticket 1001. The job ticket 1001 is such a job ticket, in which only the print configuration of job level is described, and the description in the hierarchy lower than that of the Doc element is omitted. The description of the print configuration of job level will be omitted in order to simplify the description. FIG. 10B is a diagram illustrating an example of a difference file 1003. The configuration of printing two copies of the page number three is described in the difference file 1003.

Figure 10C:
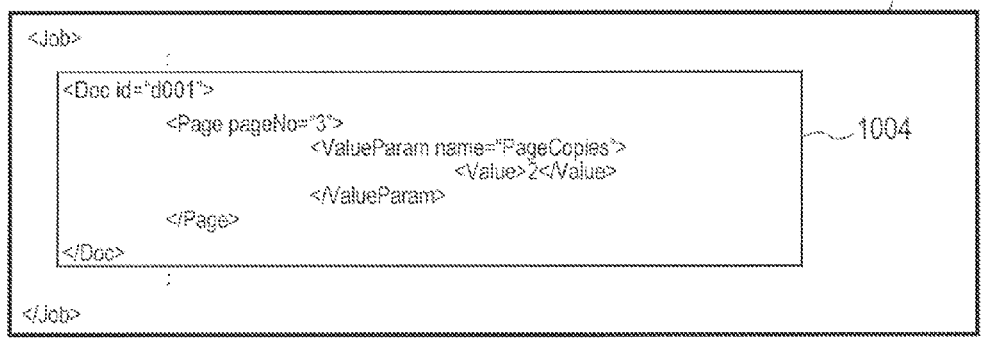
FIG. 10C is a diagram illustrating an example of the corrected job ticket.

A case of adding the print configuration of the page number three by applying the difference file 1003 to the job ticket 1001 will be described. First, the job ticket correction part 1504 describes the Doc element in the job ticket 1001. Although a Doc element name can be defined to the Doc element by an "id", it may be any name if the Doc element is uniquely determined. The job ticket correction part 1504 adds the print configuration of page level of the page number three described in the difference file 1003 to a low-level hierarchy of the Doc element of the job ticket 1001 after adding the Doc element. FIG. 10C is a diagram illustrating an example of a job ticket 1002 after performing the correction. The job ticket 1002 after performing the correction is such a job ticket acquired as a result of adding the print configuration of page level of the page number three to the job ticket 1001. Description portions of the above-mentioned Doc element and the print configuration of page level are indicated by a region 1004. The job ticket 1002 becomes such a job ticket of indicating to print two copies of a third page.

FIG. 11A is a diagram illustrating an example of a job ticket 901 in which a Doc element of defining a configuration-target page exists. The job ticket 901 has a Doc element d001 which defines pages from StartPage=1 to EndPage=4 and a Doc element d002 which defines pages from StartPage=5 to EndPage=8. As to a difference file, it will be described by using the difference file 1003 illustrated in FIG. 10B. Since the Doc element d001, which defines page number three of the configuration-target, already exists in the job ticket 901, the job ticket correction part 1504 may add the print configuration of page level to a low-level hierarchy of the Doc element d001 of the job ticket 901. FIG. 11B is a diagram illustrating an example of a job ticket 902 after performing the correction. The job ticket 902 is such a job ticket acquired as a result of adding the print configuration of page level of the page number three described in the difference file 1003 to the Doc element d001 of the job ticket 901. A region 903 indicates a portion of adding the print configuration.

As mentioned above, even if the description of a Doc element of a job ticket is an insufficient description, the print configuration for each page can add to the job ticket by complementing the Doc element.

Second Embodiment

It will be described about the second embodiment. In the first embodiment, even if the Doc element exists, when a configuration-target page does not exist within a page range defined by the Doc element, a process is terminated by treating as an error. However, in the second embodiment, when the Doc element which defines the configuration-target page does not exist, the print configuration of the configuration-target page is enabled to be added by adding the Doc element of a job ticket such that all the pages are to be defined before that the difference file is applied to the job ticket. Hereinafter, it will be described about an adding method of the Doc element. Here, the job ticket illustrated in FIG. 13A to be described later is such a job ticket which is in a state of lacking the Doc element. The Doc element which defines pages from the page number five to the page number eight is described in the job ticket illustrated in FIG. 13A, and the Doc element which defines pages from the page number one to the page number four is omitted. A region 1204 illustrated in FIG. 13A is a portion of lacking the Doc element. Therefore, in order to define all the pages by the Doc elements, the Doc element which defines pages from the first page to the fourth page has to be added. A job ticket 1206 illustrated in FIG. 13B to be described later is such a job ticket, which is in a case that the deficient Doc element was added. A region 1207 indicates the added Doc element. In addition, the job ticket correction part 1504 can define the Doc element of pages from StartPage to the last page by omitting EndPage. Therefore, in case of desiring to add the Doc element of pages from the start page to the last page, the job ticket correction part 1504 sets a numerical value after the maximum page (here, 8) described in the job ticket to the StartPage and adds the Doc element of omitting the EndPage. Or, the job ticket correction part 1504 omits the EndPage of the Doc element having the maximum page. As described above, a method of adding the Doc element such that all the pages lacked in the definition of the job ticket are to be defined is called a deficient Doc element adding method.

FIG. 12 is a flow chart indicating an example of an information process to be performed by an information processing apparatus according to the second embodiment.

Since steps S1101 to S1106 and S1111 are the same as the steps S801 to S806 and S810 indicated in FIG. 9 of the first embodiment respectively, the description thereof will be omitted.

In a step S1107, when it was judged that a Doc element which defines a configuration-target page does not exist in the job ticket, the job ticket analysis part 1505 advances a process to a step S1109.

In the step S1109, the job ticket correction part 1504 adds the Doc element which defines the configuration-target page by the above-mentioned deficient Doc element adding method.

Subsequently, in a step S1110, the job ticket correction part 1504 adds the print configuration of the configuration-target page.

FIG. 13A is a diagram illustrating an example of a job ticket 1201. The Doc element of pages from the fifth page to the eighth page is described in this ticket. A region 1204 indicated in FIG. 13A is a portion of lacking the Doc element. As to a difference file, it will be described by using the difference file 1003 illustrated in FIG. 10B. The job ticket correction part 1504 applies the difference file 1003 to the job ticket 1201 and adds the print configuration of the third page. FIG. 13B indicates such a job ticket, which is in a case that the deficient Doc element was added, as mentioned above. FIG. 13C is a diagram illustrating an example of a job ticket 1202 acquired as a result of applying the difference file 1003 to the job ticket 1201. The job ticket correction part 1504 adds the Doc element which defines pages from StartPage=1 to EndPage=4 to the job ticket 1201 by the above-mentioned deficient Doc element adding method. In addition, the job ticket correction part 1504 adds the print configuration of page level of the page number three to a low-level hierarchy of the added Doc element. A region 1203 illustrated in FIG. 13C is an added portion.

As another example, it will be described about a case that middle page numbers are missing. FIG. 14A is a diagram illustrating an example of a job ticket 1601, in which the definition is lacked. A region 1604 indicated in FIG. 14A is a portion of lacking the Doc element. As to the difference file, it will be described by using the difference file 1003 illustrated in FIG. 10B. FIG. 14B is a diagram illustrating an example of a job ticket 1602 acquired as a result of applying the difference file 1003 to the job ticket 1601. The job ticket correction part 1504 adds the Doc element which defines pages from StartPage=3 to EndPage=4 to the job ticket 1601, in which the definition is lacked, by the above-mentioned deficient Doc element adding method. In addition, the job ticket correction part 1504 adds the print configuration of page level of the page number three to a low-level hierarchy of the added Doc element. A region 1603 illustrated in FIG. 14B is an added portion.

As mentioned above, even when the Doc element which defines a configuration-target page does not exist, the print configuration of page level can be added by adding the Doc element of a page in which the definition is lacked.

Third Embodiment

It will be described about the third embodiment. In the first embodiment, when a designated page number is included in plural Doc elements, a process is terminated by treating as a structural error of the job ticket. However, in the third embodiment, even when the designated page is included in the plural Doc elements, the description of a Page element is enabled to be added by reconstituting the Doc element and the below ranks.

FIG. 15 is a flow chart indicating an example of an information process to be performed by an information processing apparatus according to the third embodiment.

Since steps S1301 to S1310 are the same as the steps S1101 to S1110 indicated in FIG. 12 of the second embodiment respectively, the description thereof will be omitted.

In a step S1306, the job ticket analysis part 1505 judges whether or not the Doc elements, of which the page ranges to be defined are overlapped, exist. When the Doc elements, of which the page ranges to be defined are overlapped, exist, the job ticket analysis part 1505 advances a process to a step S1311, and when the Doc elements, of which the page ranges to be defined are overlapped, do not exist, the job ticket analysis part 1505 advances the process to a step S1307.

In the step S1311, the job ticket correction part 1504 merges the print configuration of page level of the same page number of the Doc element and the below ranks. More specifically, the job ticket correction part 1504 once discards the plural existing Doc elements and describes Page elements held by the respective Doc elements in the same level. At this time, when Page elements having the same page number exist, the job ticket correction part 1504 collectively describes parameters held by respective Page elements in one Page element. When the same plural parameters exist, the job ticket correction part 1504 gives priority to a value of a previously described parameter and deletes the subsequent descriptions.

Next, in a step S1312, the job ticket correction part 1504 adds a Doc element which defines all the pages to a low-level hierarchy of the job element as a new Doc element and describes the Page element, which was merged in the step S1311, in a low-level hierarchy of the above-mentioned Doc element.

Next, in a step S1313, the job ticket correction part 1504 describes the print configuration of a configuration-target page in the Doc element.

When a parameter of the configuration-target page already exists in the job ticket, the job ticket correction part 1504 replaces only the value of the print configuration with a value of the difference file.

FIG. 16A is a diagram illustrating an example of a job ticket 1401, in which plural Doc elements which define a configuration-target page to the job ticket exist. The job ticket 1401 has a Doc element d001 which defines pages from StartPage=1 to EndPage=7 and a Doc element d002 which defines pages from StartPage=6 to EndPage=8. FIG. 16B is a diagram illustrating an example of a difference file 1403. The configuration of printing two copies of the page number six is described in the difference file 1403. It will be described about a case that the print configuration of the page number six is added by applying the difference file 1403 to the job ticket 1401. First, the job ticket correction part 1504 discards plural Doc elements of the job ticket then merges the print configuration of page level held by each of the Doc elements. Here, when the same parameter of the same page number exists at the stage of merging the print configuration, the job ticket correction part 1504 preferentially describes a value of the parameter which exists in the previously described Doc element d001. Thereafter, the job ticket correction part 1504 describes the print configuration of the page number six described in the difference file 1403. FIG. 16C is a diagram illustrating an example of a job ticket 1402 acquired as a result of applying the difference file 1403 to the job ticket 1401. A region 1404 illustrated in FIG. 6C is an added portion. Since a description of the page number six exists in the job ticket 1401, a value of PageCopies is changed from 3 to 2.

As mentioned above, even when a designated Page element is included in the plural Doc elements, the print configuration of page level designated in the difference file is enabled to be added.

Other Embodiments

Moreover, the present invention can also be realized by performing a process of supplying software (programs) for realizing the functions of the above embodiments to a system or an apparatus through a network or various storage media and causing a computer (such as a CPU or an MPU) of the system or the apparatus to read out and execute the supplied programs.

As just described, according to the embodiments of the present invention, for example, even if the description of the Doc element of the job ticket to be inserted in the hot folder is insufficient, it is possible to temporarily change the print configuration for each page. In other words, it is possible to easily change the print configuration information temporarily.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

According to the present invention, it is possible to easily change the print configuration information temporarily.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2012-133749, filed Jun. 13, 2012, which is hereby incorporated by reference herein in its entirety.

What is claimed is:

1. An information processing apparatus comprising a computer, which, when operated, functions as:
   an acquiring unit configured to acquire content data, a print configuration file which can define a print configuration, and a difference file which has a plurality of hierarchies and in which information for changing the print configuration can be described, from a folder, the print configuration file being able to have a job level, a document level in a low-level hierarchy of the job level, and a page level in a low-level hierarchy of the document level;
   a determining unit configured to determine whether or not the document level exists in the print configuration file;
   a correcting unit configured to correct the print configuration file based on the difference file; and
   a processing unit configured to perform a print process based on the content data and the print configuration file,
   wherein, in response to the determining unit determining that the document level does not exist in the print configuration file, the correcting unit adds the document level to the print configuration file and adds the print configuration in the page level of the document level based on the difference file.

2. The information processing apparatus according to claim 1, wherein the computer further functions as a print request unit configured to, in a case where a trigger file indicating a start of the print process is stored in the folder, start the print process of the content data stored in a folder having a name same as that of the trigger file.

3. The information processing apparatus according to claim 1, wherein the computer further functions as a changing unit configured to change the print configuration file according to the difference file, and
   wherein the processing unit performs the print process based on the content data and the print configuration file changed by the changing unit.

4. The information processing apparatus according to claim 1, wherein the print configuration file is a structured document, and the difference file is a text file.

5. An information processing method comprising:
   acquiring content data, a print configuration file which can define a print configuration, and a difference file which has a plurality of hierarchies and in which information for changing the print configuration can be described, from a folder, the print configuration file being able to have a job level, a document level in a low-level hierarchy of the job level, and a page level in a low-level hierarchy of the document level;
   determining whether or not the document level exists in the print configuration file;
   correcting the print configuration file based on the difference file; and
   performing a print process based on the content data and the print configuration file,
   wherein, in response to the determining the document level does not exist in the print configuration file, adding the document level to the print configuration file and adding the print configuration in the page level of the document level based on the difference file.

6. The information processing method according to claim 5, further comprising, in a case where a trigger file indicating a start of the print process is stored in the folder, starting the print process of the content data stored in a folder having a name same as that of the trigger file.

7. The information processing method according to claim 5, further comprising changing the print configuration file according to the difference file,
   wherein the print process is performed based on the content data and the changed print configuration file.

8. The information processing method according to claim 5, wherein the print configuration file is a structured document, and the difference file is a text file.

9. A non-transitory computer-readable storage medium which stores a program for causing a computer to perform an information processing method comprising:
   acquiring content data, a print configuration file which can define a print configuration, and a difference file which has a plurality of hierarchies and in which information for changing the print configuration can be described, from a folder, the print configuration file being able to have a job level, a document level in a low-level hierarchy of the job level, and a page level in a low-level hierarchy of the document level;
   determining whether or not the document level exists in the print configuration file;
   correcting the print configuration file based on the difference file; and
   performing a print process based on the content data and the print configuration file,
   wherein, in response to the determining the document level does not exist in the print configuration file, adding the document level to the print configuration file and adding the print configuration in the page level of the document level based on the difference file.

* * * * *